United States Patent

[11] 3,578,835

| [72] | Inventors | Lowell A. Noble<br>Hillsborough;<br>Robert B. Hanley, Campbell, Calif. |
|---|---|---|
| [22] | Filed | July 28, 1960 |
| [45] | Patented | May 18, 1971 |
| [73] | Assignee | Varian Associates |

[54] ART OF MAKING VACUUM ENVELOPES
7 Claims, 1 Drawing Fig.

[52] U.S. Cl. ............................................... 316/25
[51] Int. Cl. ............................................... H01j 7/18
[50] Field of Search ................................... 316/12, 20, 21, 25; 117/54, 61

[56] References Cited
UNITED STATES PATENTS
2,161,458   6/1939   De Boer et al. ............... 316/9
2,013,415   9/1935   Marden et al. ............... 316/21X
2,934,392   4/1960   De Santis et al. ............ 316/25

Primary Examiner—Robert F. Stahl
Attorneys—Leon F. Herbert and Robert W. Dilts

CLAIM: 1. A bakeout process for a vacuumtight tube containing materials which liberate gases at a given bakeout temperature and a metal which sorbs gases at said bakeout temperature, said process comprising the stops of heating said tube to said bakeout temperature to remove occluded gases, evacuating said tube during said bakeout step, cooling said gas sorbing metal during said bakeout step to maintain the gas sorbing metal at a temperature at which it is substantially ineffective to sorb gases, heating said gas sorbing metal after said bakeout step, introducing a hydrogen isotope into said tube, and cooling said tube.

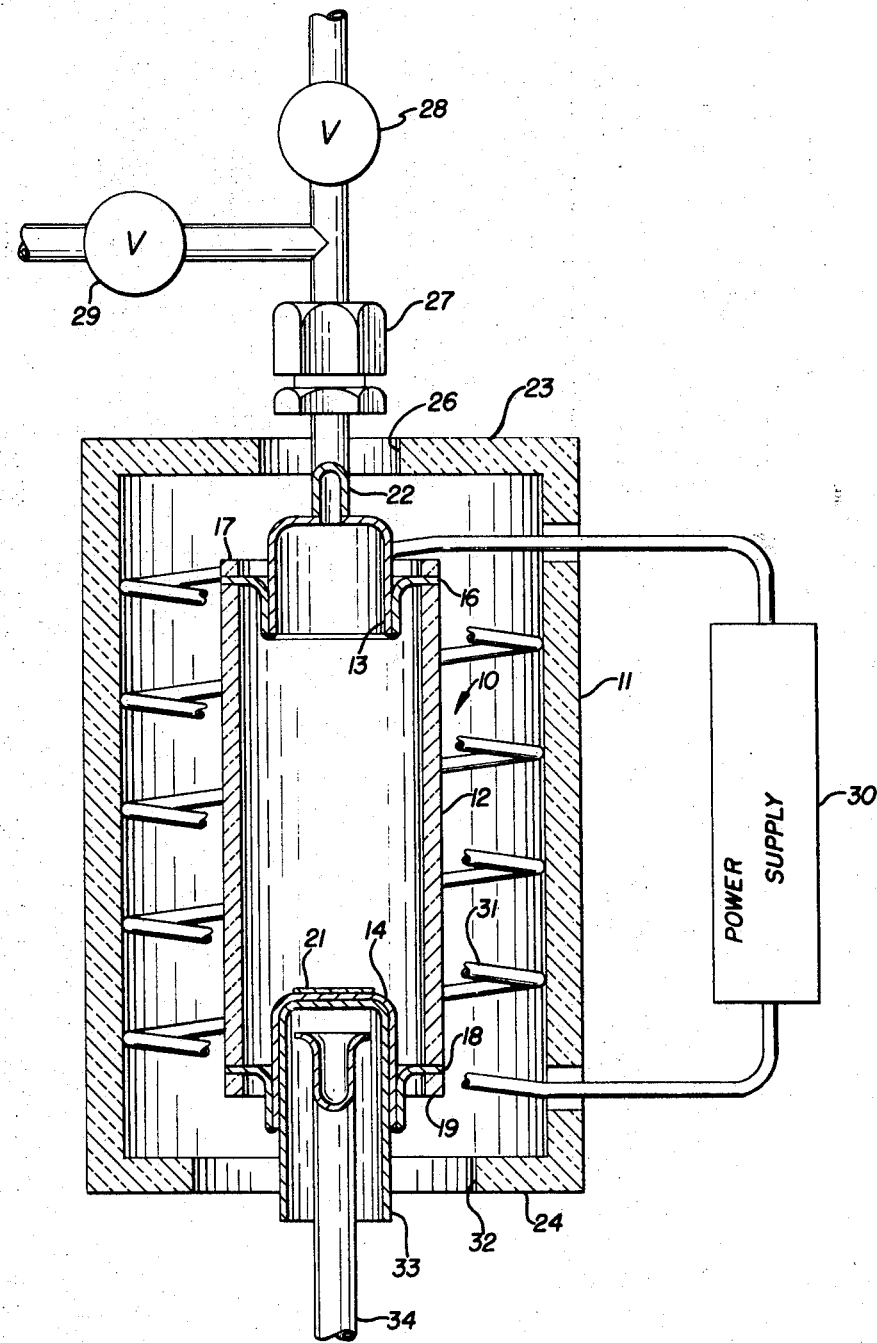
INVENTORS
LOWELL A. NOBLE
ROBERT B. HANLEY
BY
Leon F. Herbert
Robert W. Dilts
ATTORNEYS

ART OF MAKING VACUUM ENVELOPES

This invention relates to the art of making enclosed gastight envelopes having high vacua, especially to the "bakeout" art of electron or ion tubes.

In the art of producing neutron sources a material such as titanium is "loaded" with an isotope (deuterium or tritium) of hydrogen because titanium is known to readily sorb hydrogen when titanium is placed in a hydrogen atmosphere and cooled from about 450° C. The loaded titanium is then bombarded with either high energy deuterium or tritium ions. The hydrogen isotope atoms within the loaded titanium form a nuclear reaction with the high energy deuterium or tritium ions thereby producing useful neutrons. The substitution of other active metals, such as zirconium, lithium, lanthanum, yttrium, thorium, and hafnium, for titanium is well known in the art.

In a specific application of the above process the loaded titanium forms a target in a gastight envelope (tube). The tube is filled with a hydrogen isotope. Now if a negative potential of several hundred kilovolts with respect to another electrode within the envelope is placed on the loaded titanium, the hydrogen gas in the tube becomes ionized and the ions being positive are attracted to the titanium striking it with sufficient energy to produce the nuclear reaction with the hydrogen isotope therein whereby neutrons are obtained.

Alternative ion sources contain two spaced coatings of titanium which are deposited on an insulated surface of the envelope containing the loaded titanium target. The titanium coatings contain a hydrogen isotope and the isotope is ionized when a spark is produced across the space between the coatings. The ions are accelerated to the loaded titanium target which is biased negative with respect to the spark source.

In neutron sources as described the titanium is preferably made an integral part of the envelope and therefore is brazed or sealed to suitable dielectric insulators which are also a part of the envelope. For obvious reasons the titanium cannot be loaded with the hydrogen before it is installed into the tube, since the envelope must be heated in a "bakeout" oven to a high temperature to drive off all the occluded gases within the envelope walls while a vacuum pump removes the gas molecules from the tube. Any undesirable molecules within the tube will interfere with the efficient production of neutrons. When the dielectric materials and other parts of the tube are heated they start to liberate gas. Since the titanium in the tube is also heated, it starts to getter gases such as oxygen, nitrogen, Carbon monoxide, and carbon dioxide at about 200° C. Then these gases gettered in the titanium cannot be removed and the titanium cannot be reduced to pure metal no matter how high the "bakeout" temperature of the oven is made or how low a pressure is produced in the tube by the vacuum pump. An efficient tube must only contain pure titanium before it is loaded with hydrogen since sorbtion of other gases by the titanium reduces the amount of the neutrons produced. Up to now the tube was "baked out" at temperatures below 200° C. at which temperature titanium will not getter gases but the "bakeout" time was long and in some cases a small tube having a volume of one cubic inch was baked out for 16 hours before all the gases were liberated from the envelope walls.

An object of this invention is to provide a faster and improved "bakeout" process for outgassing a tube containing active metal.

Another object of this invention is to provide a process for obtaining an active metal loaded with a pure gas especially hydrogen.

Yet another object of this invention is to provide a process for loading active metal with gas.

In terms of broad inclusions the invention maintains the active metal in the tube at a low temperature, which is well below the temperature where the active metal is chemically active. This temperature for titanium is 200° C. The remaining parts of the envelope are raised to a much higher temperature and a vacuum is maintained within the tube so that the tube is "baked out." After bakeout the active metal is then loaded with a pure gas such as hydrogen or one of its isotopes by the standard process of supplying the gas within the envelope after first heating and then while cooling the active metal.

The invention contains other objects and features of advantage, some of which, with the foregoing, will be set forth in the following description of the invention. The invention is not limited to the disclosed embodiment, as variant embodiments thereof are contemplated and may be adopted within the scope of the claims.

Referring to the drawing, of which the single FIGURE shows a typical apparatus for performing the inventive process, there is shown a gas tube 10 in the process of being baked out within an oven 11. The tube 10 is stacked-ceramic type with a tubular ceramic insulator 12 disposed between two cup-shape electrodes 13 and 14. The electrode 13 has a sealing flange 16 brazed to its rim and the sealing flange 16 is in turn sealed between the ceramic insulator 12 and a ceramic backing member 17. The electrode 14 also has a sealing flange 18 brazed to its rim which flange 18 is in turn sealed between the ceramic insulator 12 and a ceramic backing member 19. When the tube is operated the electrode 14 will be biased negative with respect to the electrode 13 and will thereby attract any positive ions within the tube. Therefore, a thin titanium coating or target 21 is formed by a standard process such as vapor-plating on the interior surface of the electrode 14. As is common in the art, the thickness of the coating 21 is preferably about one or two millionth of an inch and the electrode 14 is preferably made of Kovar metal. The other electrode 13 has an exhaust tubulation 22 and like electrode 14 it too can be made of Kovar metal, although other metals such as copper, steel, etc. can be substituted for the Kovar in both electrodes. As stated above before the target 21 can be loaded with hydrogen, the gas tube 10 must be subjected to a bakeout process whereby the interior of the tube is cleaned by removing all the occluded gases on the envelope walls. In this embodiment the bakeout oven 11 is made tubular with insulated top and bottom end walls 23 and 24. The top 23 has an aperture 26 through which the tubulation 22 with a fitting 27 extends. The T-branch in the tubulation 22 connects to a vacuum pump (not shown) through a valve 28, and connects to a gas source (not shown) through a valve 29. A power supply 30 supplies electrical energy to a resistance coil 31 thereby heating the oven 11, but one may substitute other types of heating means in the oven.

Prior to this invention, the gas tube 10 together with its electrode 14 and titanium target 21 would be evacuated through valve 28 and would be uniformly heated by the oven 11 to only 200° C. But this invention teaches a process for maintaining the electrode 14 and preferably only the titanium target 21 below 200° C. while the rest of the tube is raised to a higher temperature. The drawing shows one embodiment of the methods and apparatus for cooling the target 21. This embodiment teaches an aperture 32 in the bottom wall 24 of the oven through which aperture a metal cup-shape member 33 made of good heat-conduction material is inserted within the cup of electrode 14. The rim of the cup-shape member 33 terminates outside the oven 11. A tube 34 directs cold air to the closed end of member 33 thereby keeping the member 33, electrode 14, and the target 21 cool since they are all in close proximity to each other. After the tube is baked out and when all the occluded gases are driven off the heated parts of the tube, the cold air supply is stopped and the electrode 14 and target 21 are heated and baked out. Hydrogen is then introduced into the tube 10 trough valve 29 and then valve 29 may or may not be closed. The power supply 30 is turned off to cool the oven and the coating 21 thereby sorbs the hydrogen gas.

Only one embodiment of an apparatus by which the target 21 may be kept cool during bakeout is shown. Other embodiments of this apparatus incorporating the teaching of this invention will be apparent to one skilled in the art without departing from the teachings herein. One can readily cool the target with water, or one can place the part of the tube in which the target is disposed outside the oven during bakeout.

Ion sources as well as targets may be located on the interior vacuum envelope and may be loaded in a similar manner.

We claim:

1. A bakeout process for vacuumtight tube containing materials which liberate gases at a given bakeout temperature and a metal which sorbs gases at said bakeout temperature, said process comprising the steps of heating said tube to said bakeout temperature to remove occluded gases, evacuating said tube during said bakeout step, cooling said gas sorbing metal during said bakeout step to maintain the gas sorbing metal at a temperature at which it is substantially ineffective to sorb gases, heating said gas sorbing metal after said bakeout step, introducing a hydrogen isotope into said tube, and cooling said tube.

2. A bakeout process as claimed in claim 1 in which said gas sorbing metal temperature is maintained no higher than about 200° C. during said bakeout step, and said gas sorbing metal is heated to at least about 450° C. after said bakeout step.

3. A bakeout process as claimed in claim 1 in which said gas sorbing metal is selected from the group consisting of titanium, zirconium, lithium, lanthanum, yttrium, thorium and hafnium.

4. A process for baking out a vacuum tube of the type comprising an envelope containing materials which liberate gases at a given bakeout temperature and a metal which sorbs gases at said bakeout temperature, said method comprising the steps of heating the tube to said bakeout temperature, evacuating the tube during said heating step, and maintaining said gas sorbing metal at a substantially lower temperature than said bakeout temperature during said heating step, said lower temperature being a temperature at which said gas sorbing metal is substantially ineffective to sorb gases.

5. A bakeout process as claimed in claim 4 in which said gas sorbing metal is selected from the group consisting of titanium, zirconium, lithium, lanthanum, yttrium, thorium and hafnium.

6. A bakeout process as claimed in claim 4 in which said gas sorbing metal is maintained at said lower temperature by the application of a fluid coolant to the exterior of said envelope at the location of said gas sorbing metal.

7. A process for baking out a tube of the type comprising materials which liberate gases at a given bakeout temperature and a metal which sorbs gases at said bakeout temperature, said method comprising the steps of heating the tube to said bakeout temperature to remove gases from said materials which liberate gases at said bakeout temperature, removing said liberated gases from said tube, and maintaining said gas sorbing metal at a substantially lower temperature than said bakeout temperature during said bakeout step, said lower temperature being a temperature at which said gas sorbing metal is substantially ineffective to sorb gases.